(12) United States Patent
McLean et al.

(10) Patent No.: US 9,963,817 B2
(45) Date of Patent: May 8, 2018

(54) VIBRATION ISOLATOR

(71) Applicant: Fisher & Paykel Appliances Limited, Auckland (NZ)

(72) Inventors: Brian Paul McLean, Pukekohe (NZ); Valentin Pierre Nouguier, Auckland (NZ)

(73) Assignee: Fisher & Paykel Appliances Limited (NZ)

( * ) Notice: Subject to any disclaimer, the term of this patent is extended or adjusted under 35 U.S.C. 154(b) by 0 days. days.

(21) Appl. No.: 15/187,266

(22) Filed: Jun. 20, 2016

(65) Prior Publication Data
US 2016/0377144 A1 Dec. 29, 2016

(30) Foreign Application Priority Data

Jun. 24, 2015 (NZ) ........................................ 709428

(51) Int. Cl.
| | |
|---|---|
| *F16M 1/00* | (2006.01) |
| *D06F 37/24* | (2006.01) |
| *D06F 37/26* | (2006.01) |
| *F16F 1/02* | (2006.01) |
| *D06F 39/08* | (2006.01) |
| *D06F 39/12* | (2006.01) |
| *D06F 23/04* | (2006.01) |

(52) U.S. Cl.
CPC ............ *D06F 37/24* (2013.01); *D06F 37/267* (2013.01); *F16F 1/025* (2013.01); *D06F 23/04* (2013.01); *D06F 39/085* (2013.01); *D06F 39/12* (2013.01)

(58) Field of Classification Search
CPC ........ D06F 37/267; D06F 37/24; D06F 23/04; D06F 39/085; D06F 39/12; F16F 1/025
USPC ................ 248/632, 633, 634, 649, 672, 678
See application file for complete search history.

(56) References Cited

U.S. PATENT DOCUMENTS

| | | | | |
|---|---|---|---|---|
| 4,471,633 | A * | 9/1984 | Tinsler | ................... F25D 23/006 62/277 |
| 7,910,841 | B2 * | 3/2011 | Germanton | ............ G01G 21/23 108/57.12 |
| 7,921,679 | B2 * | 4/2011 | Jo | ......................... D06F 39/125 248/346.01 |

(Continued)

*Primary Examiner* — Gwendolyn W Baxter
(74) *Attorney, Agent, or Firm* — Clark Hill PLC; Timothy M. McCarthy

(57) ABSTRACT

A vibration isolator suitable for isolating and/or dampening vibrations generated in a vibrating machinery component such as a motor or pump so as to minimise the unwanted effects (such as audible secondary sounds) of those vibrations. The isolator may be installed in a home appliance such as a laundry washing machine and may be a separate, unitary component installed between a motor/pump and the structure of the laundry machine or may be installed between a mounting bracket of the motor/pump and the laundry machine. Alternatively, the isolator may be integrally formed with a pump/motor mounting bracket, on upper and/or lower surfaces of a mounting flange. The isolator is preferably formed from a substantially incompressible material and in one preferred embodiment has a washer-like form with a central opening at least partially surrounded by a tubular ridge with a plurality of radial projections extending outwardly and/or inwardly from outer/inner surface(s) of the tubular ridge.

19 Claims, 4 Drawing Sheets

(56) References Cited

U.S. PATENT DOCUMENTS

| | | | |
|---|---|---|---|
| 9,016,653 B1 * | 4/2015 | Cox, Jr. ............ | B65D 19/0002 248/346.01 |
| 2014/0159556 A1 * | 6/2014 | Joo ..................... | D06F 39/12 312/228 |
| 2014/0292166 A1 * | 10/2014 | Hwang ................ | D06F 39/12 312/228 |

* cited by examiner

VIBRATION ISOLATOR

PRIORITY

This application claims priority to New Zealand Provisional Patent Application No. 709428, filed Jun. 24, 2015, the disclosure of which is incorporated herein by reference.

TECHNICAL FIELD

This invention relates to vibration isolation arrangements and in particular, though not solely, to vibration isolating arrangements that are incorporated within or are a part of a mounting arrangement between a motor or pump and an electrical or home appliance such as a laundry clothes washing machine.

BACKGROUND ART

Electrical appliances often include motors or pumps that, during operation, transfer vibrational motion to other connected components of the appliance. For example, laundry clothes washing machines usually incorporate a pump for removing soil- or detergent-containing water from a laundry load within an outer bowl (also known as a washtub). The removed water may be recirculated back into the outer bowl or may be expelled to a drain. In the case of a laundry washing machine of the "top-loading" or "vertical-axis" variety the pump may be attached beneath the outer bowl, directly to the base of the outer bowl via a mounting arrangement. During operation of the pump, vibrations generated by the rotation of the rotor and impeller of the pump are transmitted through the mounting arrangement to the outer bowl and may also be transmitted to the cabinet or "wrapper" of the machine via the suspension system and other attachment points. Such vibrations of the outer bowl and/or the cabinet, which have a much larger surface area than the pump or are resonantly excitable parts, can result in unwanted audible noise.

It is known to provide a damping arrangement between the pump and the outer bowl to reduce the amplitude of the transmitted vibrations. Such known damping arrangements utilise compressible rubber or elastomeric washers or spacers surrounding fasteners connecting the pump (or a mounting bracket holding the pump) to the base of the outer bowl. Whilst such washers/spacers reduce transmitted vibrations to the body of the appliance, in some cases their effectiveness only reaches an acceptable level when the volume of compressible material, and therefore the axial spacing between the pump/bracket and the base of the outer bowl, is increased to a sufficiently large value. In many modern home appliances, such as laundry clothes washing machines, space within the cabinet is at a premium and often it is desirable to minimise the distance between the base of the outer bowl and the pump/bracket.

It is also known to utilise dampers comprising a solid, for example a metal such as brass, "crush" tube surrounded by a compressible rubber or elastomeric material disk to dampen vibrations between the pump and outer bowl. The crush tube has a central hole through which the fastener passes and the rubber/elastomeric disk has a thickness comparable to the axial length of the crush tube with an annular circumferential groove in an outer cylindrical face. This type of damper must be mounted to a hole in a flange of a pump bracket by being pushed through a slot in the edge of the flange. It will be appreciated that this type of damper necessarily has a relatively large outer diameter, as well as a significant axial length, and so takes up a relatively large spatial volume on and around the mounting bracket. Such a requirement places restrictions on the design and layout of the pump bracket.

It would therefore be desirable to utilise an axially shorter vibration damping arrangement that still achieves acceptable vibration isolation results.

It is therefore an object of the present invention to provide a vibration isolator, a vibration-isolating mounting arrangement, a mounting bracket or an electrical appliance which will go at least some way towards overcoming the above disadvantages, or which will at least provide the public or industry with a useful choice.

SUMMARY OF INVENTION

In a first aspect, the invention may broadly be said to consist in a vibration isolator comprising:
   a plurality of longitudinal spacing elements arranged with their longitudinal dimension in a common plane about a central space,
   a connecting web or webs connecting the plural spacing elements together so that the vibration isolator is a unitary component,
   wherein a thickness of each of the spacing elements, in a direction substantially perpendicular to the longitudinal dimension, is substantially the same.

In a second aspect, the invention may broadly be said to consist in a vibration-isolating mounting arrangement on a first object for isolating vibrations transmitted between the first object and a second object, comprising:
   a flange on the first object, the flange having opposing first and second surfaces and an opening therebetween for receiving a headed fastener for connecting the first and second objects together with the flange clamped between the head of the fastener and the second object, the first and/or second surface of the flange, in the region surrounding the opening, provided with at least one ridge extending above the respective first and/or second surface,
   wherein the at least one ridge of the first or second surface of the flange is adapted to present a reduced contact area to a surface of the second object or to a surface of the head of the fastener.

In a third aspect, the invention may broadly be said to consist in a mounting bracket for attaching a vibration-generating device to an electrical appliance, the mounting bracket including a vibration-isolating mounting arrangement according to the second aspect, wherein the mounting bracket is the first object and the electric appliance is the second object.

In a further aspect, the invention may broadly be said to consist in an electrical appliance comprising:
   a body,
   a mechanical vibration-generating device mounted to the body, either directly or via a mounting bracket, and
   a vibration-isolating mounting arrangement according to the second aspect between the body and either the mechanical vibration-generating device or, if present, the mounting bracket, wherein the body of the electrical appliance comprises the second object and the mechanical vibration-generating device, or the mounting bracket when present, comprises the first object.

The invention consists in the foregoing and also envisages constructions of which the following gives examples only. The following description will concentrate on the incorporation of embodiments of the invention within a top-loading or "vertical-axis" laundry clothes washing machine in order to reduce vibrations transmitted from a water pump to the body of the washing machine. However, it will be readily appreciated that the vibration isolator and related assemblies in accordance with embodiments of the invention are applicable in general to isolating or reducing the transmission of and/or amplitude of vibrations from any vibration-generating object or device to another object on which the vibration generating device is mounted or to which it is mechanically connected. Furthermore, the vibration-generating device may be mounted directly or indirectly (for example, via a mounting bracket) to the other object. The vibration-generating device is exemplified as a pump having dual wash and drain functionality although it may of course be a single function wash pump or drain pump or may alternatively be, for example, any other device capable of generating vibrations such as an electric motor or a compressor. The object to which the vibration-generating device is mounted/connected may, for example, be a different electronical or home appliance such as a front-loading or "horizontal-axis" laundry clothes washing machine, a laundry clothes drier, a dishwasher, a refrigerator, a range hood, an extractor fan, an air transfer fan, an oven or an air-conditioning unit.

BRIEF DESCRIPTION OF DRAWINGS

Preferred forms of the invention will now be described with reference to the accompanying drawings in which.

DESCRIPTION OF EMBODIMENTS

Figure 1:
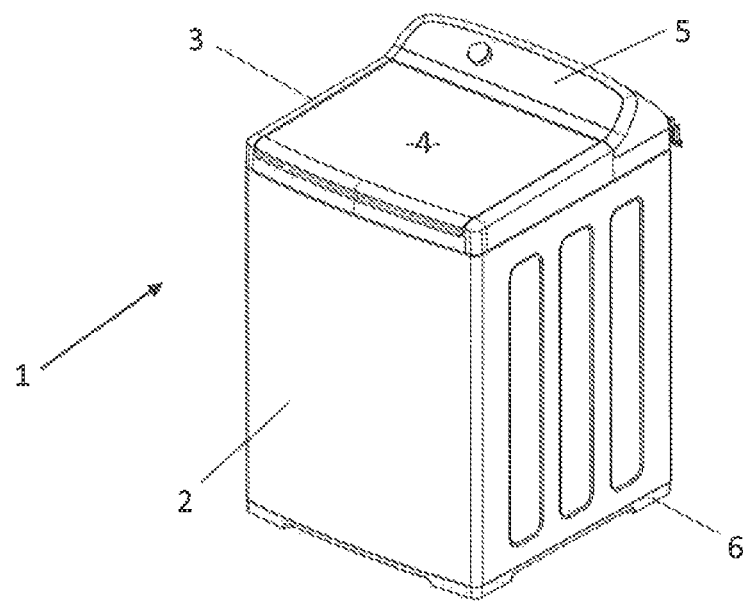
FIG. 1 is a perspective view from above of a laundry clothes washing machine incorporating a vibration isolator in accordance with an embodiment of the present invention.

A laundry clothes washing machine 1 of the top-loading or "vertical-axis" type is illustrated in FIG. 1. As with most electric, electrical or home appliances, the laundry clothes washing machine 1 includes an external cabinet or "wrapper" which in the present case is shaped as a substantially square or rectangular prism having open top and bottom ends. The wrapper may be formed by folding and welding or clinching painted sheet steel, for example. The top end of the wrapper is provided with an assembly 3 including a lid 4 and a console 5 with user input and display elements and may house an electronic controller which controls operation of the machine. The bottom of the wrapper may be provided with an assembly 6 incorporating mounting feet.

Figure 2:
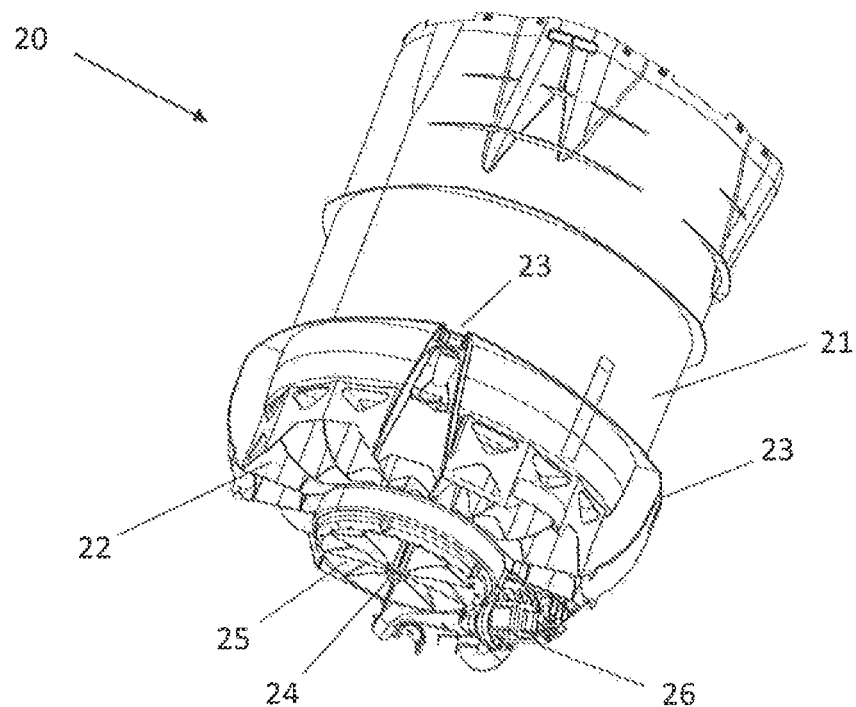
FIG. 2 is a perspective view from below of the outer bowl assembly of the laundry clothes washing machine of FIG. 1.
Figure 3:
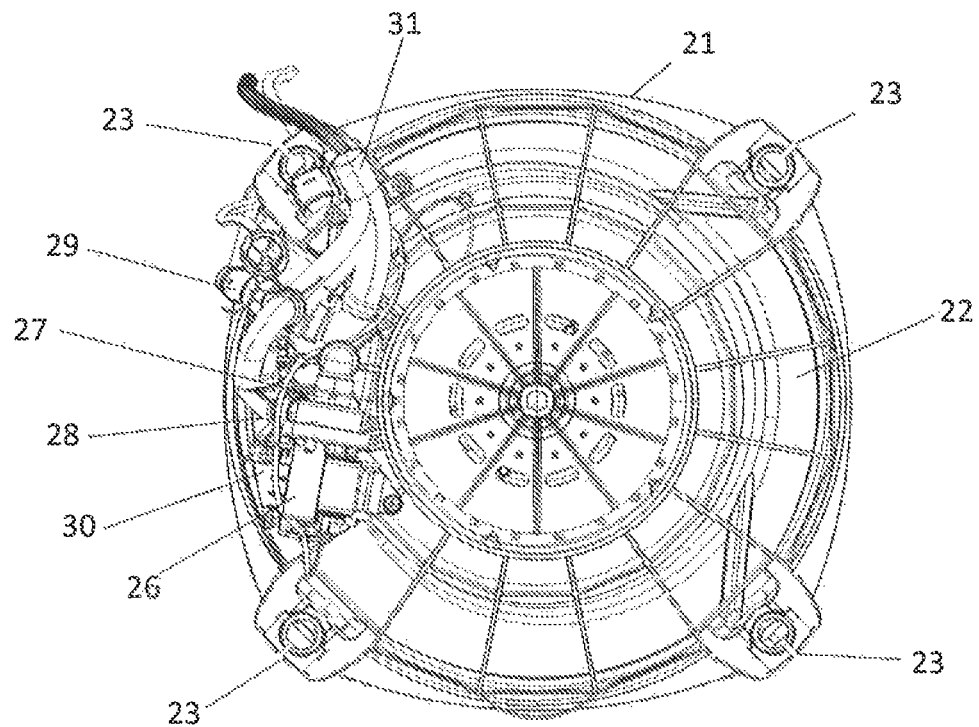
FIG. 3 is a bottom view of the outer bowl assembly of FIG. 2.

Within the wrapper 2 of laundry clothes washing machine 1 is an outer bowl assembly 20 as seen in FIG. 2. The outer bowl assembly 20 is essentially a cylindrical bowl or tub having a side wall 21 and a base 22. Outer bowl assembly 20 may be formed by a plastics injection moulding process and is mounted within wrapper 2, beneath assembly 3, via a suspension system (not shown). The suspension system may comprise suspension rods as is well-known in the art which suspend the outer bowl assembly from the upper part of the wrapper. The lower ends of the suspension rods may be mounted within features 23 at the lower part of the outer bowl assembly, as best seen in FIG. 3.

A spin tub (sometimes referred to as a laundry basket—not shown) is located within the outer bowl assembly, mounted on a shaft 24 which extends through the base 22 of the outer bowl assembly. The spin tub receives a laundry load during operation of the machine and is similar in shape to the outer bowl assembly, having a side wall and a base. As is well-known, an agitator or wash plate (not shown) is ordinarily provided within the spin tub, connected to the upper end of the shaft which passes through seals in the bases of both the outer bowl assembly and the spin tub. The lower end of shaft 24 is driven by an electric motor 25 which in the illustrated example is an electronically commutated external-rotor motor wherein the stator is mounted directly to the base 22 of the outer bowl assembly with the rotor directly connected onto the end of shaft 24.

Also attached to base 22 of the outer bowl assembly is a wash/drain pump assembly 26 (hereinafter simply referred to as pump 26) which at certain stages of a washing cycle, under operation of a control device, is energised to draw washing liquid from within the outer bowl assembly 20 via an inlet port 27 in fluid connection with a sump region within the outer bowl assembly. Washing liquid drawn into inlet port 27 exits the pump via pump outlet port 28. As required at various stages of a wash program, washing liquid exiting the pump via outlet port 28 may be recycled back into the spin tub via a recirculation conduit 29 or, alternatively, the washing liquid may be expelled from the machine to an external drain via drain conduit 31.

Pump 26 may, for example, comprise a synchronous motor pump such as model number DPS35 sold under the trade mark HAFLOWTIC by Hanning Elektro-Werke GmbH & Co. KG of Germany. Although pump 26 could be mounted directly to base 22 of the outer bowl assembly, it is preferably attached to a mounting bracket 30 which is itself attached to base 22. Mounting bracket 30 is shown in more detail in FIGS. 5A, 5B and 5C and may be injection moulded from plastics material such as glass-filled polypropylene.

Mounting bracket 30 includes a substantially planar flange region 50 and a central pump-mounting structure. The pump-mounting structure, in the exemplary embodiment shown in the drawings, includes mounting holes such as holes 51 and 52 in a first leg 54 extending substantially perpendicularly to flange region 50 at a first axial end of the bracket. A second mounting leg 53 is provided at the opposite axial end of the mounting bracket, also extending substantially perpendicularly to the flange region 50 and may include a cable-holding opening at its distal end. The mounting holes 51, 52 (and others—not shown) may each receive a fastener such as a screw which may pass from the inner side of the bracket (the side shown in FIG. 5A) and into an appropriately-positioned hole in another part (for example, a flange) of the pump assembly. A contoured pump-mounting slide surface 58 may also be provided on the mounting bracket for receiving a correspondingly contoured surface of the pump. In this way, once the fasteners have been secured, pump 26 is rigidly held by the mounting bracket.

In order to fix mounting bracket 30 to base 22 of the outer bowl assembly, flange regions 50 are provided with a plurality of openings 55 (three openings are shown in the drawings).

Each opening 55 is provided to receive the shaft of a fastener 40 such as a screw which is driven into an appropriately positioned hole (not shown) in base 22 of the outer bowl assembly. Preferably the holes in base 22 are formed axially in cylindrical posts or bosses protruding from the surface of base 22. Curved guiding structures 57 may be provided about holes 55 extending above the surface of the underside of mounting bracket 30 to assist in installation by capturing the upper ends of the posts or bosses on the base of the outer bowl assembly. The mounting bracket may therefore be rigidly attached to base 22 of outer bowl assembly 20, once screws 40 are tightened, between the heads of screws 40 and the bosses.

Such a mounting arrangement as has just been described has been found, under some circumstances, to result in excessive audible noise emission from the laundry clothes washing machine during operation of pump 26. Such unwanted noise has been traced to pump 26 which, by its very nature, acts as a vibration-generating device. Some of the audible noise may result from the pump assembly vibrating in mounting bracket 30 but the majority of the audible noise may result from pump vibrations transmitted through the mounting bracket and fastening arrangement and causing the outer bowl (and in some instances, the spin tub) to vibrate. The resulting vibrations of the relatively large surface area of the outer bowl assembly produce the unwanted excessive audible noise.

In an experiment, the electrical supply operating frequency of the pump was 50 Hz and it was found that the dominant frequencies within the generated audible noise were 100 Hz and other harmonics of the operating frequency. Simply providing large rubber, or other elastic/compressible isolators between the mounting plate flange region 50 and both the heads of screws 40 was found to significantly reduce the sound power level of the generated audible noise. However, such a solution requires additional machine parts/costs and also, because the effectiveness of such a solution requires a certain volume of compressible material to be present to successfully attenuate vibrations, the isolators must have a thickness of between about 1 mm to about 5 mm and a diameter of between about 15 mm to about 20 mm. These dimensions limit the ability of the designer of the pump bracket to minimise its occupied volume and also in arranging the layout of the features of the pump bracket which must fit within or around other components on the base of the outer bowl assembly. This is disadvantageous as there is limited space beneath the outer bowl assembly in a completed, manufactured appliance and an allowance must still be made for the suspension assembly to expand during operation of the machine and/or due to a contained load of laundry and/or water.

The present invention therefore overcomes or at least ameliorates these problems by incorporating vibration isolators 56 with mounting bracket 30. Vibration isolators 56 may be injection moulded as a part of the mounting bracket 30 or may be over-moulded on the already moulded mounting bracket, potentially from a different material with a desirable vibration-attenuating property. Preferably the vibration isolators are formed from a substantially incompressible or inelastic or substantially rigid material, for example, a plastics material such as a polyamide, preferably a Nylon. The height of the vibration isolators may be between about 2 mm and about 5 mm above or below the level of flange region 50. Although isolators are shown as being provided on both the upper and lower surfaces of flange region 50, an acceptable sound power level reduction may be achieved by only including one of the isolators per fastener, preferably the isolator on the underside of the mounting bracket, adjacent base 22. As shown in Table 1 below, it has been found during testing that use of such vibration isolators produced a reduction in sound power level of generated audible noise comparable to that produced by the above-mentioned conventional rubber dampers.

TABLE 1

Comparison of isolator types

| | Isolator type | | |
|---|---|---|---|
| | No isolator | Plastics | Rubber |
| Sound power level (dBA) | 61.9 | 49.2 | 47.5 |

Figure 5A:
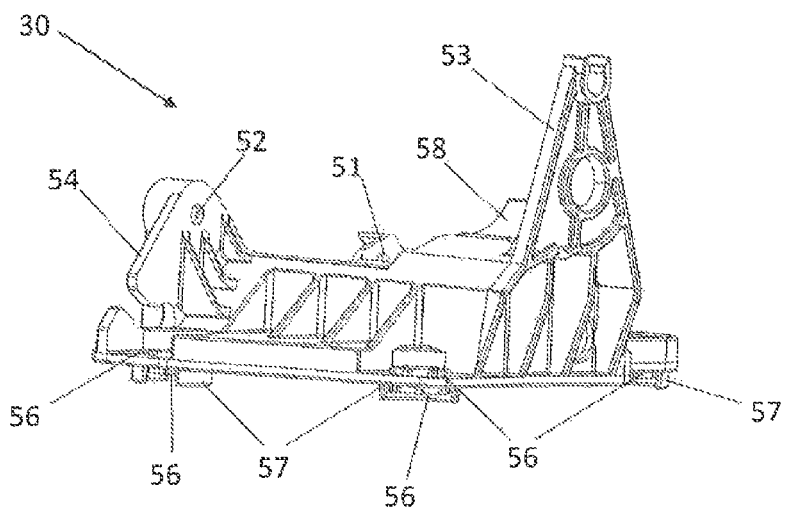
FIG. 5A is a perspective view of the wash/drain pump mounting bracket shown in FIG. 4.
Figure 5B:
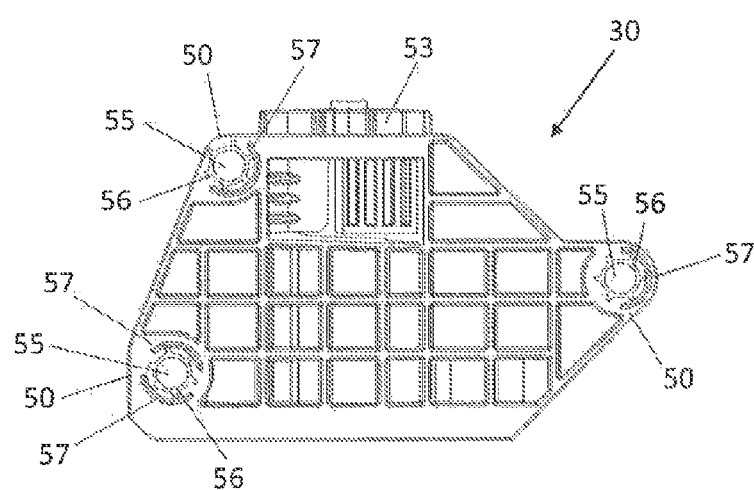
FIG. 5B is a bottom view of the mounting bracket of FIG. 5A.
Figure 5C:
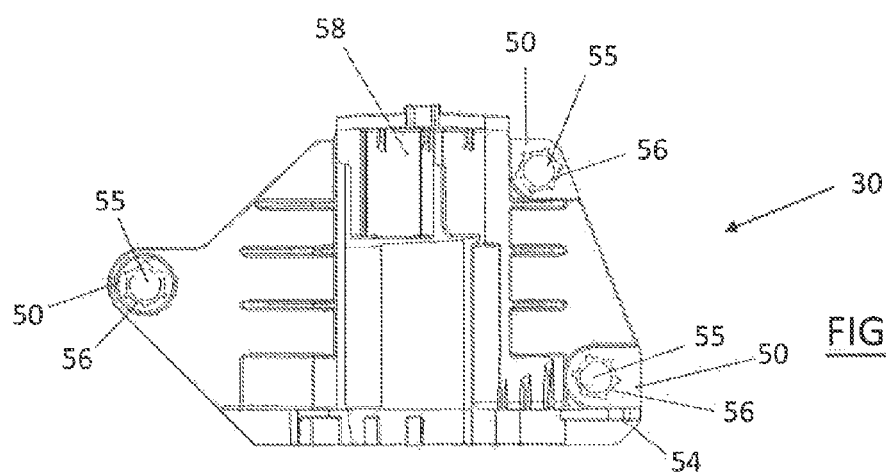
FIG. 5C is a plan view of the mounting bracket of FIG. 5A.

As most clearly seen in FIGS. 5B and 5C, in the exemplary embodiment shown in the drawings, both the upper and lower vibration isolators are formed from a central, tubular portion surrounding opening 55 as well as a number of protruding portions or fingers extending away from a radially outer side surface of the tubular portion. The central tubular portion need not be circular and could be an alternative closed or open shape such as any polygonal cylinder. The upper surface of the tubular portion should be substantially flat and preferably perpendicular to the axis of its opening 55. Also, the protruding portions need not extend radially, like spokes of a wheel, as shown in the drawings but could instead extend tangentially or in any other direction from the tubular portion. The protruding portions need not be straight and they could instead be curved or zig-zagged, for example. Preferably the protruding portions contact the outer side surface of the tubular portion but one or more of them could be spaced a predetermined distance away from the tubular portion so that there is no continuous upper surface of the vibration isolator 56. The number of protruding portions is also not an essential part of the invention as although six protruding portions are shown per isolator, a smaller or larger number could instead be provided. It is also not essential that the tubular portion is continuous, particularly on the isolator not in contact with the underside of the head of the fastener. That is, the tubular portion could have one or more breaks in its surface so that it is an open curve about the opening. For example, the tubular portion may be a semi-cylinder comprising an axially-extended arc, the arc provided less than 360° around opening 55 and preferably more than about 270° about the opening. Also, only the radial protruding portions could be provided on the surface of the flange, without the tubular portion.

Attachment of mounting bracket 30 to the base of the outer bowl assembly simply requires alignment of holes 55 with the holes in their respective posts or bosses on base 22 and insertion/tightening of appropriate screws. The screws should have a head with a substantially flat underside of a diameter sufficient to enable most or all of the exposed surface area of the vibration isolator to contact the underside of the screw head. For example, the outer diameter of the vibration isolators (to the outer ends of the protruding portions) may be between about 10 mm and about 15 mm, most preferably about 12 mm, and the outer diameter of the screw head is preferably substantially similarly dimensioned. The tubular portion may extend between a minimum inner diameter of about 6 mm to a maximum outer diameter of about 14 mm, most preferably the outer diameter of the tubular portion may be about 10 mm and the inner diameter of the tubular portion about 8 mm. The radial width of the tubular portion, and the lateral width of the protruding portions, may be between about 1 mm and about 3 mm, most preferably about 2 mm. Preferably, the outer diameter of the screw thread of the fastener should be smaller than the inner diameter of the hole in the vibration isolator. A gap thereby provided between the fastener and the vibration isolator will help in avoiding directly transferring vibrations from the mounting bracket to the fastener and then on to the outer bowl assembly.

Compared to the situation where conventional dampers (which incorporate compressible material) are sandwiched between the screw head and the flange, the present vibration isolators present a reduced contact area between the mounting bracket and the screw head. The reduced contact surface area helps to reduce and/or attenuate the vibrational energy transmitted from the pump/bracket through to the body of the laundry washing machine. As used herein, the term "body", in the context of an electrical or home appliance is intended to encompass the majority of the appliance, including the wrapper and major internal assemblies, to which an auxiliary component such as pump 26 may be attached. Similarly, the posts or bosses formed in base 22 may be provided with a substantially flat upper surface in a plane substantially parallel to the adjacent surface of flange region 50 of mounting bracket 30. Accordingly, the presence of the raised ribs or ridges of the vibration isolator 56, protruding away from the surrounding surface of flange region 50, reduces the surface contact area between the pump/bracket and the outer bowl assembly, also reducing, damping, decoupling or attenuating the vibrational energy transmitted through to the body of the laundry washing machine, thereby reducing the unwanted audible noise otherwise generated.

As most clearly shown in FIG. 5A, but also evident from FIGS. 5B and 5C, the protruding portions of a vibration isolator 56 may be positioned so that they are not completely aligned (in the axial direction) with a protruding portion of a corresponding vibration isolator on the opposite side of flange 50. In the example shown, it can be seen that the positions of the radial protruding portions of the upper vibration isolators shown in FIG. 5C are rotationally offset so that they are located between two adjacent protruding portions of the corresponding vibration isolator on the underside of flange region 50, shown in FIG. 5B. In this example, with six protruding portions circumferentially spaced by about 60° on each vibration isolator, an about 30° relative rotation between the upper and lower vibration isolators about the axis of hole 55 is included so that each protruding portion on one side of the flange region is substantially centred between two adjacent protruding portions on the other side of the flange region. However, it is not essential that the protruding portions be centred as shown and they could simply be circumferentially offset from a corresponding protruding portion on the opposite side of the flange.

It is believed that by ensuring that the protruding portions on either side of the flange region 50 surrounding a particular hole 55 are not completely axially overlapping (that is, when viewed axially, the protruding portions of one vibration isolator are not completely hidden behind the protruding portions of the other vibration isolator, but are preferably circumferentially offset therefrom), vibrations or sound waves travelling via the interconnected components from the pump assembly to the outer bowl assembly are forced to divide along effectively parallel paths through the vibration isolating assembly before recombining at the base of the outer bowl assembly. By varying the relative positions of protruding portions on opposing sides of the flange region, it is therefore possible to alter the path lengths travelled by each of the parallel waves so that when they recombine they are not completely in phase and may at least partially cancel out. It is also believed that it may be possible to alter the frequency response of the vibration isolator or vibration isolating assembly, to selectively dampen particular frequencies or ranges of frequencies, by adjusting any one or more of:

- the number of protruding portions,
- the length of the protruding portions (that is, the distance along their length away from the tubular portion), noting that the protruding portions of an isolator may have differing lengths,
- the width of the protruding portions, in a direction substantially perpendicular to their length, noting that the protruding portions of an isolator may have differing widths,
- the axial height of the protruding portions and/or tubular portion above/below the surface of the surrounding flange region 50 (noting that the heights need not be the same on opposing isolators on opposite sides of a flange),
- the positioning of the protruding portions within the tubular portion or outside the tubular portion (that is, some or all of the protruding portions of a tubular portion may be positioned within the tubular portion, for example, projecting radially inwardly from an inner radial surface of the tubular portion—or a vibration isolator on one side of the flange may have all protruding portions extending radially outwardly while the other vibration isolator has all of its protruding portions extending radially inwardly),
- including one or more discontinuity or break in the upper surface of the tubular portion and/or between the tubular portion and protruding portion(s),
- the diameter of the tubular portion,
- the relative diameters of the tubular portions on the upper and lower surfaces of the flange (that is, the respective tubular portions may have the same diameter of they may have different diameters), and
- the presence or absence of the tubular portion—plural protruding portions could simply be provided as longitudinal spacing elements arranged about a central space, either radially or otherwise oriented (for example tangentially or even parallel to one another) and held in position so as to create a unitary vibration isolator by thin connecting webs. The elements could be of varying length but preferably they would all have substantially the same axial thickness.

Figure 6:
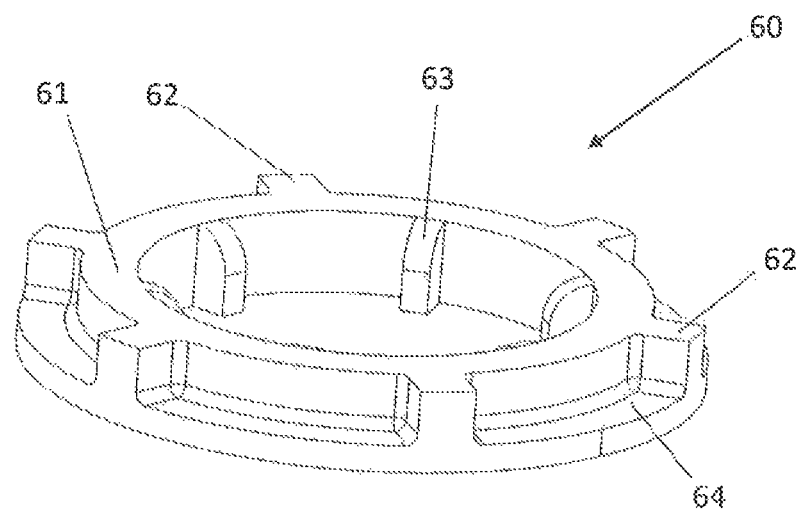
FIG. 6 is a perspective view from above of a vibration isolator in accordance with another preferred embodiment of the present invention.
Figure 4:
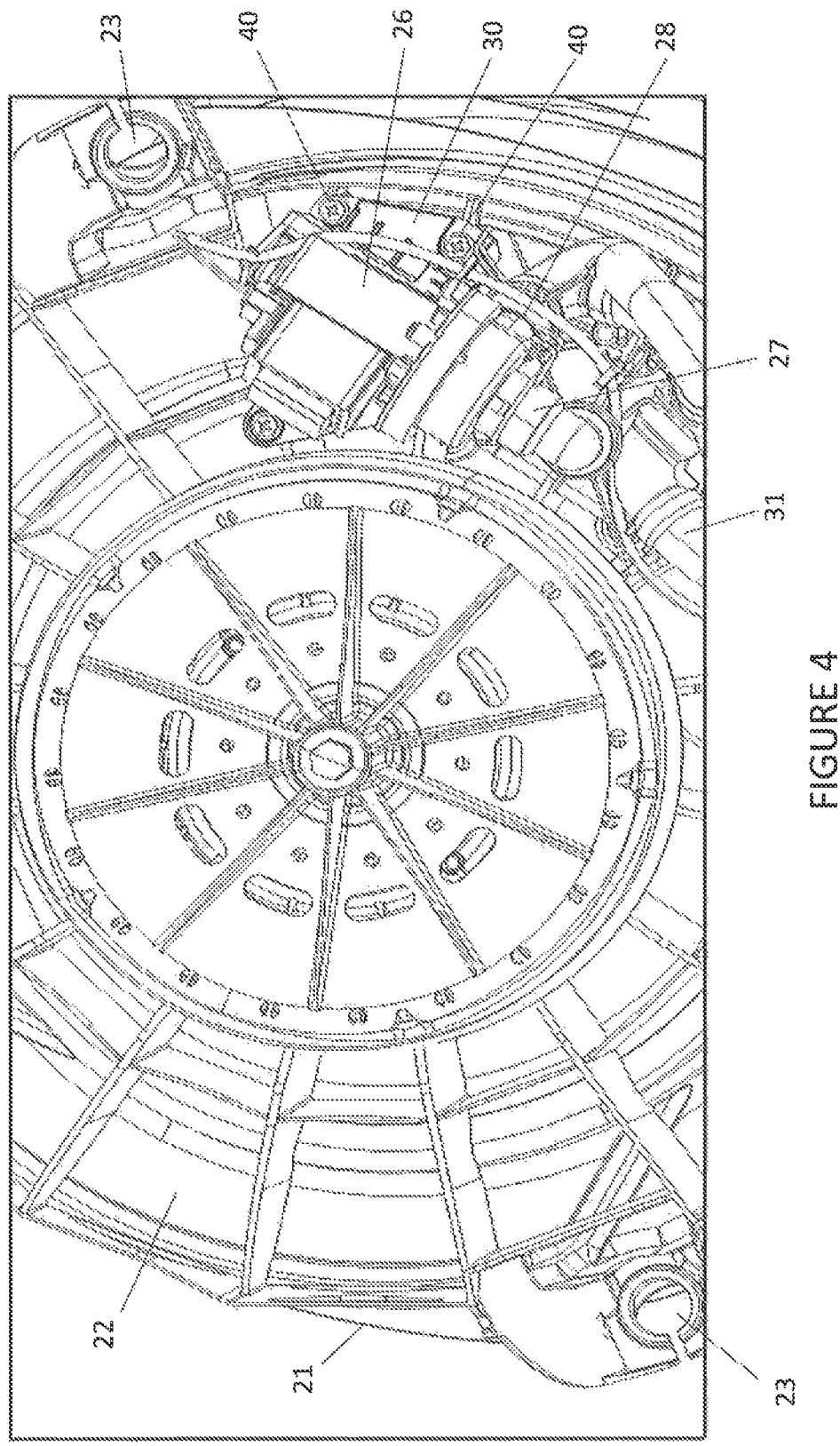
FIG. 4 is a close-up perspective view of a section of the base of the outer bowl assembly of FIG. 2 showing the wash/drain pump and its mounting bracket.

In an alternative embodiment of the invention, rather than the vibration isolators being formed integrally with or moulded to the bracket or to the pump assembly, the vibration isolators may be formed as individual, unitary washers. Such individual washers may be positioned on either side of flange region 50 of a mounting bracket similar to mounting bracket 30 of the drawing figures, but which does not incorporate vibration isolators 56. Such a washer 60, having a similar geometry to the vibration isolators of FIGS. 5A to 5C, is shown in FIG. 6. As mentioned above, the specific geometry, shape and size of the tubular portion 61 and protruding portions 62 may be varied. The tubular portion could, for example, be a circular cylindrical shape or a polygonal cylindrical shape. Washer 60 could be formed from a substantially incompressible or inelastic or substantially rigid material such as a plastics material, most preferably a polyamide such as nylon.

Washer 60 may also include a plurality of thin inwardly radially-directed flexible projections 63 simply to help centre the washer on a fastener such as a screw, whereby the projections 63 contact the surface of the screw thread so that the tubular portion is more centrally located beneath the head of the screw. It will also be seen in FIG. 6 that the lower axial side of washer 60 is provided with an annular flange 64 which projects radially outwardly from the lower part of the radially outer surface of the tubular portion. In this way, the underside of washer 60 has a flat annular surface adapted to contact a flat surface of flange region 50 of the pump mounting bracket. Annular flange 64 ensures that the position and orientation of the protruding portions 62 relative to the outer surface of the tubular portion 61 are maintained. Preferably, the outer diameter of flange 64 is substantially the same as the outer extent of the protruding portions. Preferably, the protruding portions 62 are continuous with the tubular portion but, as mentioned above in relation to the integrated vibration isolator embodiment, one or more of the protruding members 62 could be spaced away from the tubular portion 62, the tubular portion could be discontinuous (so include one or more break in its upper surface). Preferably, the inner diameter of the tubular portion is about the same as, or slightly larger than, the diameter of the hole in the flange region of the pump mounting bracket. The above-described principle of operation by which the vibration isolators 56 reduce the sound power level of unwanted audible noise also applies to the vibration-isolating mounting arrangement consisting of the washers on one or both sides of a flange of the mounting bracket.

Table 2 below shows the damping or vibration isolating effect of different Nylon compositions for washer 60. The sound power level values in Table 2 were obtained by placing a washer as shown in FIG. 6 about aligned openings on either side of flange 50 of a bracket (without the vibration isolators of FIGS. 5A to 5C) to which a pump is mounted and which is attached to the bowl base by screw fasteners. The washers on opposing sides of each hole 55 were arranged so that the upper and lower washers were rotated about the hole's axis relative to one another by about 30° (so the protruding portions of the washers were positioned substantially as shown for the integrated vibration isolators of FIGS. 5A to 5C).

TABLE 2

Comparison of various vibration isolator compositions (Pp = Polypropylene)

| Isolator material | Standard bracket- no washer | Pp 20% glass filled | Pp 10% glass filled | Nylon 6/6 | Nylon 6 | Pp 30% talc | Pp 20% talc | Pp 10% talc |
|---|---|---|---|---|---|---|---|---|
| Sound power level (dBA) | 63.6 | 55.8 | 56.4 | 50.4 | 50.8 | 55.2 | 57.5 | 53.0 |

As can be seen, washers formed from Nylon that is neither glass filled nor contains talc provided the best reduction in sound power level of the audible noise caused by pump vibrations.

In a modification of the embodiment of FIG. 6, a single unitary vibration isolator component may be produced by combining two washers 60, axially separated by the thickness of a flange 50, and connected by spacing members that integrate the two vibration isolators and co-axially positions the holes in the two washers and holds them at the appropriate axial spacing for the flange of the mounting bracket. Such a vibration isolator component may be formed by injection moulding an appropriate plastics material such as those mentioned previously and has the benefit that the isolators, once mounted to the flange, are fixed thereto. The two individual washers may be arranged with flanges 64, if provided, adjacent one another with an axial spacer or spacers therebetween that may, for example, form parts of a substantially cylindrical surface, co-axial with the openings in the two washers to allow a fastener to be inserted within the boundary of the cylindrical surface of the spacer(s). The axial height of the two washers need not be the same. To mount such a double vibration isolator component to a flange it may be necessary or desirable to have a circular hole in the flange which also includes substantially radial key slot(s) in its periphery, for example three equally spaced radial slots about the hole through the flange. The double vibration isolator component could be shaped, on one axial side, with radial projections to allow insertion of the isolator into the hole and its key slot(s) until an annular ridge, such as the underside of one of the flanges, on the annular component contacts the surface of the washer so that the washers are axially correctly located. Once axially inserted to an appropriate depth, an annular inwardly-facing groove in the radially outer surface of the isolator component and its projections would allow the double vibration isolator component to be rotated about the axis of the hole to lock it to the flange in a similar fashion to a bayonet mount on a light bulb or camera lens. Removal of the component from the flange would then require it to be rotated in the opposite direction before being axially withdrawn from the hole in the flange.

In a similar embodiment that is also capable of being fixed or attached to a flange, a double vibration isolation component could be formed by clipping together two isolators through a hole in the flange. For example, one of the isolators could be formed with axially-extending, radially flexible legs that extend through the hole, proximate its periphery, and which deflect radially inwardly against a radially inner surface of the other isolator as the two isolators are engaged and then finally spring outwardly and engage an axial outer surface of the other isolator to releasably engage the two isolators together.

The invention claimed is:

1. A vibration isolator comprising:
   a plurality of longitudinal spacing elements arranged with their longitudinal dimension in a common plane about a central space, and
   a connecting web or webs connecting the plural spacing elements together so that the vibration isolator is a unitary component,
   wherein a thickness of each of the spacing elements, in a direction substantially perpendicular to the longitudinal dimension, is substantially the same as the thickness of the other spacing elements,
   wherein the connecting web or webs comprise a circular or polygonal cylinder or semicylinder having a central opening therein in the central space,
   wherein the thickness of the spacing elements is substantially the same as the axial height of the circular or polygonal cylinder or semi-cylinder,
   wherein the circular or polygonal cylinder or semi-cylinder has axially opposed upper and lower surfaces, and wherein a flange extends radially outwardly from the lower surface, the spacing elements extending axially between the flange and the upper surface of the circular or polygonal cylinder or semi-cylinder.

2. The vibration isolator as claimed in claim 1, wherein the flange is an annular flange which extends axially between about one quarter and one half of the height of the circular or polygonal cylinder or semi-cylinder, preferably about one third of the height of the circular or polygonal cylinder or semi-cylinder.

3. The vibration isolator as claimed in claim 2, wherein the spacing elements and flange are integrally formed, preferably from an inelastic or substantially rigid or substantially incompressible material.

4. The vibration isolator as claimed in claim 1, wherein the spacing elements and flange are integrally formed, preferably from an inelastic or substantially rigid or substantially incompressible material.

5. A vibration-isolating mounting arrangement on a first object for isolating vibrations transmitted between the first object and a second object, comprising:
a flange on the first object, the flange having opposing first and second surfaces and an opening therebetween for receiving a headed fastener for connecting the first and second objects together with the flange clamped between the head of the fastener and the second object, at least one of the first and the second surface of the flange, in the region surrounding the opening, provided with at least one ridge extending above at least one of the first and the second surface,
wherein the at least one ridge of the first or second surface of the flange is adapted to present a reduced contact area to a surface of the second object or to a surface of the head of the fastener.

6. The vibration-isolating mounting arrangement as claimed in claim 5, further comprising a vibration isolator comprising:
a plurality of longitudinal spacing elements arranged with their longitudinal dimension in a common plane about a central space, and
a connecting web or webs connecting the plural spacing elements together so that the vibration isolator is a unitary component,
wherein a thickness of each of the spacing elements, in a direction substantially perpendicular to the longitudinal dimension, is substantially the same as the thickness of the other spacing elements;
wherein the connecting web or webs comprise a circular or polygonal cylinder or semi-cylinder having a central opening therein in the central space,
wherein the thickness of the spacing elements is substantially the same as the axial height of the circular or polygonal cylinder or semi-cylinder, and
wherein at least one of the circular or polygonal cylinder or semi-cylinder and the spacing elements of the vibration isolator form the at least one ridge.

7. The vibration-isolating mounting arrangement as claimed in claim 5, wherein the at least one ridge is integral with the flange of the first object.

8. The vibration-isolating mounting arrangement as claimed in claim 5, wherein the at least one ridge is formed from an inelastic or substantially rigid or substantially incompressible material.

9. The vibration-isolating mounting arrangement as claimed in claim 5, wherein the at least one ridge comprises plural ridges, each extending above the respective first or second surface by substantially the same amount.

10. The vibration-isolating mounting arrangement as claimed in claim 9, wherein the plural ridges are interconnected to form a substantially continuous or semi-continuous ridge upper surface.

11. The vibration-isolating mounting arrangement as claimed in claim 9, wherein the plural ridges include a first ridge formed about the opening and at least one second ridge extending from at least one of a radially inner surface and a radially outer surface of the first ridge, substantially perpendicularly to an axis of the opening.

12. The vibration-isolating mounting arrangement as claimed in claim 11, wherein the first ridge is substantially cylindrical or semi-cylindrical and the at least one second ridge extends at least one of radially outward from an outer surface of the first ridge and/ radially inward from a radially inner surface of the first ridge.

13. The vibration-isolating mounting arrangement as claimed in claim 11, wherein a plurality of second ridges are provided, circumferentially spaced about at least one of the inner surface and the outer surface of the first ridge.

14. The vibration-isolating mounting arrangement as claimed in claim 11, wherein each of the first and second surfaces of the flange on the first object are provided with the first and second ridges, a projected outline of at least one second ridge on the first surface not completely overlapping, when viewed in an axial direction of the opening, with a projected outline of at least one second ridge on the second surface.

15. The vibration-isolating mounting arrangement as claimed in claim 14, wherein a plurality of second ridges are provided, circumferentially spaced about at least one of the inner surface and the outer surface of the first ridge and wherein the plural second ridges on the first surface of the flange do not completely overlie the plural second ridges on the second surface of the flange.

16. The vibration-isolating mounting arrangement as claimed in claim 15, wherein at least one of the second ridges on the first surface of the flange are circumferentially located between two adjacent second ridges on the second surface of the flange, when viewed in an axial direction of the opening.

17. The vibration-isolating mounting arrangement as claimed in claim 16, wherein the second ridges extend radially outward from the outer surface of the first ridge and are evenly spaced circumferentially about the first ridge, each of the second ridges on the first or second surface of the flange located circumferentially between two adjacent second ridges of the other of the first or second surfaces of the flange, when viewed in an axial direction of the opening.

18. A mounting bracket for attaching a vibration-generating device to an electrical appliance, the mounting bracket including the vibration-isolating mounting arrangement as claimed in claim 5, wherein the mounting bracket is the first object and the electrical appliance is the second object.

19. An electrical appliance comprising:
a body,
a mechanical vibration-generating device mounted to the body, either directly or via a mounting bracket, and
the vibration-isolating mounting arrangement as claimed in claim 5 between the body and either the mechanical vibration-generating device or, if present, the mounting bracket, wherein the body of the electrical appliance comprises the second object and the mechanical vibration-generating device, or the mounting bracket when present, comprises the first object.

* * * * *